United States Patent [19]
Georgelin

[11] 4,377,731
[45] Mar. 22, 1983

[54] DEVICE FOR AUTOMATICALLY INTERRUPTING THE SUPPLY OF ELECTRIC POWER TO A MOTOR AND ITS UTILIZATION

[75] Inventor: Alexandre Georgelin, Bois-Colombes, France

[73] Assignee: Faiveley S.A., Saint Ouen, France

[21] Appl. No.: 346,072

[22] PCT Filed: Jun. 10, 1981

[86] PCT No.: PCT/FR81/00072
§ 371 Date: Jan. 26, 1982
§ 102(e) Date: Jan. 26, 1982

[87] PCT Pub. No.: WO81/03715
PCT Pub. Date: Dec. 24, 1981

[30] Foreign Application Priority Data
Jun. 11, 1980 [FR] France .......................... 80 12935

[51] Int. Cl.³ ........................................ H01H 35/10
[52] U.S. Cl. .................... 200/80 R; 318/793; 310/68 E; 73/549
[58] Field of Search .............. 310/68 E; 73/535, 549; 318/325, 793; 200/80 R, 61.7

[56] References Cited
U.S. PATENT DOCUMENTS 2,187,207  1/1940  McCabe ........................ 318/793
3,043,926  7/1962  Rabeux ......................... 200/80 R
3,176,522  4/1965  Quenneville .................. 200/80 R
4,107,483  8/1978  Jouret .......................... 200/80 R

FOREIGN PATENT DOCUMENTS 889629   1/1944  France .
1381060  1/1964  France .
264434   1/1950  Switzerland .
682361   11/1952 United Kingdom .
1493631  11/1977 United Kingdom .

Primary Examiner—G. P. Tolin
Attorney, Agent, or Firm—Young & Thompson

[57] ABSTRACT

The device is intended to cut-off the supply of electric power to a motor (4) automatically when this latter is locked rotationally under the action of a mechanical resistance.

This device comprises balls (5) coupled for rotation with the motor (4) and displaceable under the action of the centrifugal force generated at the time of rotation of this motor, these balls (5) being in cooperating relation with an electric contact (9) in order to put the electric power supply of the motor (4) in circuit when this centrifugal force attains a certain threshold value and in order to put this supply out of circuit when this centrifugal force drops under the action of the mechanical resistance set up in opposition to the torque exerted by the motor.

Utilization in particular in automatic devices for the control of opening and closing of garage doors.

6 Claims, 5 Drawing Figures

U.S. Patent  Mar. 22, 1983  4,377,731
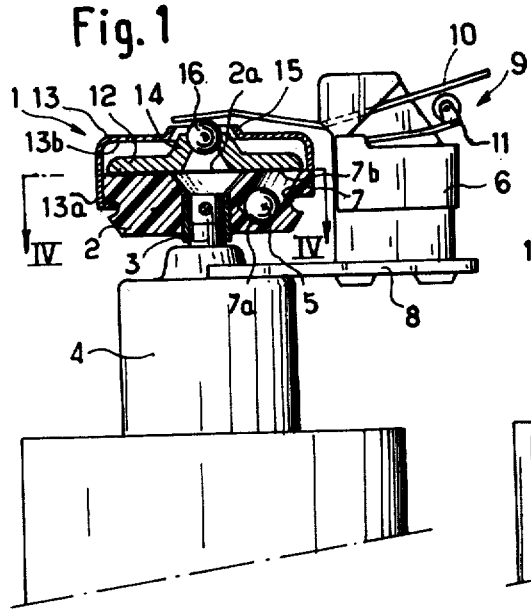
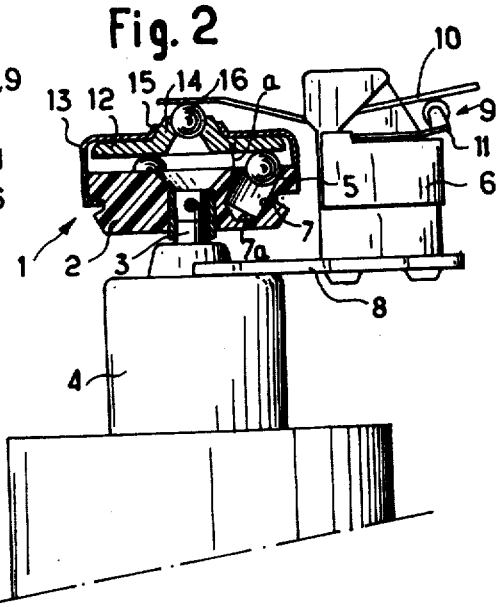
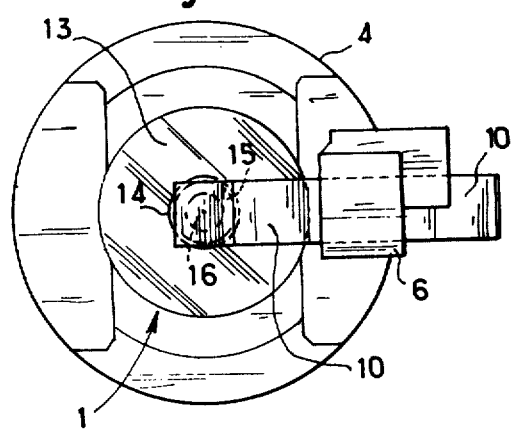
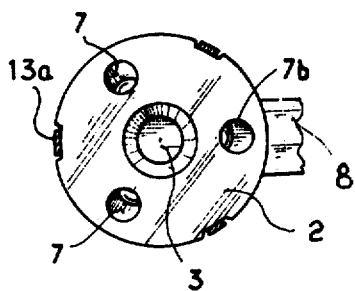
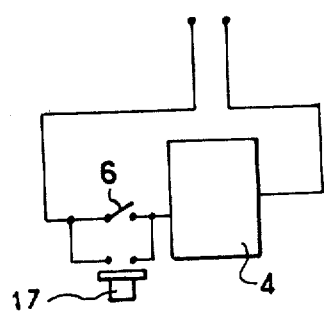

DEVICE FOR AUTOMATICALLY INTERRUPTING THE SUPPLY OF ELECTRIC POWER TO A MOTOR AND ITS UTILIZATION

This invention relates to a device for automatically interrupting the supply of electric power to a motor when this latter is locked rotationally under the action of a mechanical resistance applied in opposition to the torque exerted by this motor.

The invention is also directed to the use of a device of this type for automatically interrupting the current supply to a motor which controls opening and closing of a door, especially a garage door when this latter is at the end of its opening or closing movement.

In the event that the opening of a door such as a garage door, for example, is controlled by an electric motor, starting and stopping of the motor are controlled by a simple switch in the majority of instances. At the end of travel of the door, this electric motor is locked against rotation. In order to prevent damage to the motor, the supply of electric power to this latter must be cutoff as soon as the motor has been locked rotationally. Many safety systems have been proposed for this purpose and have the effect of dispensing with the need for any manual action by the user in order to cut-off the electric power supply to the motor at the ends of travel of the object which is driven by the motor.

These devices comprise end-of-travel switches of the mechanical or electromechanical control type. These devices have the disadvantage of being complicated and costly. In consequence, these devices are reserved for doors which have very large dimensions, are heavy and costly.

Devices of this type which are also known comprise a mass which is displaceable under the action of a centrifugal force in order to close or open an electric contact. The disadvantage presented by these devices takes the form of deficient sensitivity which often arises from defective guiding of the member used for ensuring electrical contact and which results in harmful friction and energy losses.

The object of the present invention is to overcome the above-mentioned disadvantage by producing a device for automatically interrupting the supply of electric power to a motor, which is simple and inexpensive to construct while being extremely sensitive.

In accordance with the invention, the device for automatically interrupting the supply of electric power to a motor when this latter is locked under the action of a mechanical resistance, comprising masses coupled for rotation with the motor and displaceable under the action of the centrifugal force generated at the time of this rotation in order to put the electric power supply of the motor in circuit and in order to put this power supply out of circuit when said centrifugal force drops, is characterized in that it comprises a body of revolution fixed on one of the ends of the motor shaft and provided with recesses for said masses, a disk which is free with respect to this shaft and rests against that face of the body in which the entrance of the recesses for said masses are formed and masks said entrances and a cap covering said disk and attached to the body, which is provided on the face remote from the body of revolution with a central protuberance whose apex is in contact with a conductive strip of the switch, said central protuberance of the disk being capable of fitting within a complementary opening formed in the end-wall of the cap.

By means of the device in accordance with the invention, intervention by the user is limited to actuation of a member such as a push-button for initiating start-up of the motor. This push-button can be released by the user as soon as the supply of electric power is produced by closing of the electric contact controlled automatically by the mass which is displaceable under the action of centrifugal force.

When a mechanical resistance is applied in opposition to the torque exerted by the motor, for example at the end of the opening or closing movement of a door, the centrifugal force drops, which automatically initiates opening of the electric contact and causes the electric power supply of the motor to be put out of circuit.

The device in accordance with the invention thus advantageously replaces all the end-of-travel switches which are complicated and costly and employed in the prior art.

Furthermore, by reason of the fact that the disk is free with respect to the body and to the shaft of the motor, this disk is capable under the action of the masses displaced by centrifugal force of moving towards the cap without friction and without any danger of jamming, thus ensuring that the device in accordance with the invention has excellent sensitivity and reliability of operation.

Furthermore, at the end of a displacement, the central protuberance of the disk fits within the opening of the cap, thus ensuring perfect centering of the disk and resultant equilibrium of the moving parts.

Moreover, the device in accordance with the invention has low inertia by reason of the fact that the movable disk is free with respect to the body.

In accordance with a preferred embodiment of the invention, the protuberance and the opening are frustoconical in the device according to the invention, thus making it possible to obtain excellent guiding of the displacement of the disk towards the cap without giving rise to any friction.

Preferably, the body of revolution is provided with cylindrical blind-end recesses in uniformly spaced relation about the axis of the body, these blind-end recesses being each intended to receive a metallic ball, these balls being all intended to constitute said displaceable masses, the axes of the recesses being inclined with respect to the axis of the body so as to ensure that the end-walls of the recesses are closer to the axis of the body than the entrance of these recesses.

At the time of setting in rotation of the motor, the balls move within the inclined recesses away from the axis of the body of revolution and bear against the member which is located opposite to the entrances of these recesses. This member is thus displaced by the balls, which initiates closure of the electric contact comprising the flexible conductive strip.

Conversely, when the motor encounters a mechanical resistance, the balls return to the initial position, thus ensuring displacement of the aforementioned member towards its inactive position in which it is applied against the cylindrical body. The result thus obtained is to cut the motor out of circuit.

Further particular features and advantages of the invention will become apparent from the description given hereinafter.

In the accompanying drawings which are given by way of non-limitative example:

FIG. 1 is a partial longitudinal sectional view of a device in accordance with the invention and mounted on the shaft of an electric motor, FIG. 2 is a view which is similar to FIG. 1, the device being in the operating position, FIG. 3 is a top view of the device in accordance with FIG. 1, FIG. 4 is a sectional view along the plane IV—IV of FIG. 1, FIG. 5 is a diagram of the circuit for the supply of electric power to the motor comprising the device in accordance with the invention.

In the embodiment of FIGS. 1 to 4, the device 1 in accordance with the invention mainly comprises a body of revolution 2 of plastic material fixed on the end of the shaft 3 of the motor 4, this body 2 being intended to contain balls 5, and a switch 6 being provided for putting the electric power supply of the motor 4 in circuit or out of circuit.

The body of revolution 2 has three cylindrical blind-end recesses 7 (see FIG. 4) located at uniform intervals around the axis of the body 2. These recesses 7 each receive a ball 5. The axis of these recesses 7 is inclined with respect to the axis of the body 2 in such a manner as to ensure that the end-walls 7a of these recesses 7 are closer to the axis of the body 2 than the entrance 7b of these recesses.

The bore of these cylindrical recesses 7 is slightly larger than the diameter of the balls 5 so that these latter are capable of free displacement within these recesses 7.

The switch 6 is secured by means of a metallic strip 8 to the external frame of the motor 4 near the end of its shaft 3. This switch 6 is provided with an electric contact 9 composed of two conductive and flexible strips 10, 11 which are capable of coming into contact with each other as indicated in FIG. 2 in order to put the electric power supply of the motor 4 in circuit.

The conductive strip 10 is resiliently applied against a disk 12 centered on the axis of the body 2 which rests in the inactive position (see FIG. 1) against the flat face 2a of the body 2 on which the entrances 7b of the cylindrical recesses 7 are located.

This disk 12 which is free with respect to the body 2 is covered by a cap 13, the external edge 13a of which is attached by crimping, for example, to the periphery of the body 2.

The end-wall 13b of this cap 13 limits the displacement of the disk 12 in the axis of the body over a distance a which is substantially equal to the radius of the balls 5 (see FIG. 2) in order to prevent these latter from escaping completely from their respective recesses 7.

Furthermore, the disk 12 is provided on the face remote from the body of revolution with a frusto-conical central protuberance 14 which is capable of fitting (see FIG. 2) within a complementary frusto-conical opening 15 formed in the end-wall 13b of the cap 13. This frusto-conical protuberance 14 and this complementary opening 15 thus serve to guide the axial displacement of the disk 12 without friction. In the example shown, the contact between the flexible conductive strip 10 and the disk 12 is established by means of a ball 16 located at the apex of the frusto-conical protuberance 14 of the disk 12.

By way of example, the motor 4 can have a power of a few hundred watts, a speed of rotation of the order of 3000 revolutions per minute; the cylindrical body 2 has in this case a diameter equal to 4 cm and the balls 5 contained within this latter have a diameter of 6 mm and a weight equal to 6.5 g.

The device which has just been described is preferably employed for automatically cutting-off the electric power supply to a motor for controlling the opening and closing movements of a garage door when this latter is at the end of the opening or closing range of travel.

In an application of this type, the circuit for the supply of electric power to the motor 4 comprises (see FIG. 5) a push-button 17 connected in parallel with the switch 6 of the device in accordance with the invention.

Within the scope of the application mentioned above, the operation of the device in accordance with the invention is as follows:

In the inactive position, the balls 5 are located at the bottom 7a of the cylindrical recesses 7 of the body of revolution 2 of plastic material.

In order to initiate start-up of the electric motor 4 or in other words opening or closing of a door, the user depresses the push-button 17. The motor 4 rapidly attains its normal speed of rotation. Under the action of centrifugal force, the balls 5 are displaced within the respective recesses 7 and project with respect to the entrances 7b of these latter, thus having the effect of displacing the disk 12 towards the position shown in FIG. 2. This displacement causes pivotal displacement of the conductive strip 10 which is applied against the ball 16 and consequently results in closing of the electric contact 9. At the end of the displacement, the disk 12 is applied against the end-wall 13b of the cap 13, its frusto-conical central portion 14 being engaged within the complementary opening 15 formed at the center of this cap 13.

The electric motor 4 is thus self-supplied with electric current. The user can then release the push-button 17.

Opening or closing of the door is thus continued without any further intervention on the part of the user. At the end of travel, the door comes up against the stop. The electric motor 4 thus encounters a mechanical resistance which prevents further rotation. The centrifugal force exerted on the balls 5 drops abruptly, thus causing the balls 5 to return to their inactive position at the bottom of the recesses 7. The disk 12 then reverts to the position of FIG. 1 and opens the electric contact 9. The supply of electric power to the motor 4 is thus automatically cut-off without any manual intervention by the user.

From the foregoing description, it is noted that the construction of the device in accordance with the invention is particularly simple. It can be adapted in particular to all types of electric motors. To this end, it is only necessary to adapt the mass of the balls 5 to the speed of rotation of the motor; this speed must be sufficient to ensure displacement of the balls by centrifugal action.

The device is of very small overall size and can be fixed directly on the output shaft of an electric motor without any need to extend this shaft by reason of the fact that only the body 2 of the device is engaged on this shaft and that the disk 12 and the cap 13 are free with respect to this latter.

Furthermore, experience has shown that the device in accordance with the invention was particularly sensitive and reliable and did not call for any maintenance.

Its use is particularly convenient since the user does not need to be in the least concerned with problems of ends of travel.

The particularly economical design of the device in accordance with the invention makes it accessible to any private individual who is desirous of installing on his garage door a system for automatic opening and closing.

As is clearly understood, the invention is not limited to the examples which have just been described and many modifications can be made in these latter without departing from the scope of the invention.

Thus the balls 7 can be replaced by any other mass which is displaceable under the action of centrifugal force and cooperates with a switch for putting the electric power supply of the motor in circuit or out of circuit.

The disk 12 can be replaced by any other mechanical component which is capable of undergoing displacement by means of the displaceable mass mentioned above.

The device in accordance with the invention can be employed in all applications in which it is desired to control automatically the interruption of the power supply to a motor when the metallic object which is driven by this motor reaches the end of its travel and in which a mechanical resistance is applied in opposition to the torque exerted by the motor.

The electric circuit comprising the push-button 17 can also comprise a timing device which is set so as to supply the motor during a sufficient period of time compatible with the length of time required to obtain closure of the electric contact 6 which is associated with the device in accordance with the invention.

As can readily be understood, it serves no useful purpose to fix the device in accordance with the invention directly on the shaft of the motor. It can in fact be fixed on any shaft which is driven in rotation by a motor unit, whether or not through the intermediary of speed-reduction or counter-motion drive elements.

I claim:

1. Device for automatically interrupting the supply of electric power to a motor (4) when this latter is locked under the action of a mechanical resistance, comprising means (5) coupled for rotation with the motor (4) and displaceable under the action of the centrifugal force generated at the time of this rotation in order to put the electric power supply of the motor in circuit and in order to put this power supply out of circuit when said centrifugal force drops, characterized in that it comprises a body of revolution (2) fixed on one of the ends of the shaft (3) of the motor (4) and provided with recesses (7) for said masses (5), a disk (12) which is free with respect to this shaft and rests against that face (2a) of the body (2) in which the entrances (7b) of the recesses (7) of said masses (5) are formed and masks said entrances (7b) and a cap (13) covering said disk (12) and attached to the body (2), which is provided on the face remote from the body of revolution (2) with a central protuberance (14) whose apex is in contact with a conductive strip (10) of the switch (6), said central protuberance (14) of the disk (12) being capable of fitting within a complementary opening (15) formed in the end-wall (13b) of the cap (13).

2. Device in accordance with claim 1, characterized in that the protuberance (14) and the opening (15) are frusto-conical.

3. Device in accordance with either of claims 1 or 2, characterized in that the body of revolution (2) is provided with cylindrical blind-end recesses (7) in uniformly spaced relation about the axis of the body (2), these blind-end recesses (7) being each intended to receive a metallic ball (5), these balls (5) being all intended to constitute such displaceable masses, the axes of the recesses (7) being inclined with respect to the axis of the body (2) so as to ensure that the end-walls (7a) of the recesses (7) are closer to the axis of the body (2) than the entrances (7b) of these recesses.

4. Device in accordance with claim 1, characterized in that the cap (13) which covers the disk (12) is attached by means of its external edge (13a) to the periphery of the body (2).

5. Device in accordance with claim 1, characterized in that the apex of the central protuberance (14) is in contact with the conductive strip (10) through the intermediary of a ball (16).

6. Utilization of the device in accordance with claim 1 for automatically interrupting the supply of electric power to a control motor for actuating the opening and closing of a door when this latter is at the end of the opening or closing range of travel.

* * * * *